US007009473B2

(12) United States Patent
Zhang

(10) Patent No.: US 7,009,473 B2
(45) Date of Patent: Mar. 7, 2006

(54) GROUND-FAULT CIRCUIT INTERRUPTER WITH REVERSE WIRING PROTECTION

(75) Inventor: Long Zhang, Shanghai (CN)

(73) Assignee: Shanghai Ele Mfg. Co. Ltd, Shanghai (JP)

( * ) Notice: Subject to any disclaimer, the term of this patent is extended or adjusted under 35 U.S.C. 154(b) by 11 days.

(21) Appl. No.: 11/129,699

(22) Filed: May 13, 2005

(65) Prior Publication Data

US 2005/0264383 A1 Dec. 1, 2005

(30) Foreign Application Priority Data

May 21, 2004 (CN) ...................... 200420059770 U

(51) Int. Cl.
*H02H 3/00* (2006.01)

(52) U.S. Cl. .............................. 335/6; 335/17; 335/21; 335/157; 361/42; 361/115

(58) Field of Classification Search .................... 335/6, 335/17, 21, 24, 25, 35, 36, 38, 157, 166, 335/172–176; 361/42–50, 115
See application file for complete search history.

(56) References Cited

U.S. PATENT DOCUMENTS

2004/0021996 A1 * 2/2004 Wu et al. ..................... 361/42

* cited by examiner

*Primary Examiner*—Ramon M. Barrera
(74) *Attorney, Agent, or Firm*—Thomas I. Rozsa; Tony D. Chen

(57) ABSTRACT

A circuit interrupting device having a reverse wiring protection function is disclosed. The circuit interrupting device includes a housing having a cover and a base, a mounting plate, and an electrical component mounting member, a pair of input hot and neutral conductors and a pair of output hot and neutral conductors, a differential transformer for detecting a leakage current, a disconnecting mechanism for connecting and disconnecting the output conductors to and from input conductors, and a mechanism for preventing reverse wiring, which includes a coil connected to the input hot and neutral conductors and a moveable piece that moves when the coil is energized. The input and output conductors are electrically connected only when the coil is energized by correctly connecting the power wires to the input conductors of the device. This device thus provides both leakage current protection and reverse wiring protection that protects against incorrect wiring during installation.

8 Claims, 10 Drawing Sheets

A-A

A-A

GROUND-FAULT CIRCUIT INTERRUPTER WITH REVERSE WIRING PROTECTION

BACKGROUND OF THE INVENTION

1. Field of the Invention

The present invention generally relates to the field of leakage current protection devices, and more particularly relates to ground-fault circuit interrupters with reverse wiring protection features.

2. Description of the Prior Art

With the increasing use of household electrical appliances, more attention is paid to the safety of using such appliances. When constructing a building, people want not only to install more power outlet receptacles on the interior surface of the building, but also ensure that the power outlet receptacles can prevent power leak by utilizing a ground-fault circuit interrupter (GFCI) which can be reliably installed and safely used.

Power outlet receptacles equipped with GFCIs are generally known, and are described in, e.g., U.S. Pat. Nos. 4,237,435, 4,247,840 and 4,595,894. These devices have a shortcoming in that they cannot prevent power leakage when their electrical connecting wires are reversed upon installation, which presents a real safety hazard. For example, if during installation, input wires from a power source are erroneously connected to the output connectors (LOAD) of the GFCI receptacle, and output wires going to a load are erroneously connected to the input connectors (LINE) of the GFCI receptacle, the reset button (RESET) and test button (TEST) can still be depressed as if in normal operation to break or make the connection between the input and output of the GFCI receptacle. However, the receptacle under such a condition will not function to provide ground fault protection, and moreover, will mislead the user into assuming that the receptacle is functioning properly, possibly causing personal harm to the user.

SUMMARY OF THE INVENTION

To solve the above problem and other problems in current GFCI receptacles, embodiments of the present invention provide a safer GFCI receptacle with reverse wiring protection that can be installed in the interior of buildings. When such GFCI receptacle is incorrectly installed by connecting the power source lines to the output connectors of the receptacle, the receptacle can effectively function to cut off electrical output.

Defined broadly, the present invention is a circuit interrupting device having: hot and neutral input conductors for connecting to hot and neutral lines of a power source; hot and neutral output conductors for connecting to hot and neutral lines of a load; a coil electrically connected to the hot and neutral input conductors; a moveable piece capable of moving from a first position to a second position when the coil is energized; a switch electrically connected to the coil, the switch having a locking mechanism cooperating with the moveable piece to lock the moveable piece when it is in its second position, the switch being in a closed condition that electrically connects the coil to the input conductors when the moveable piece is in its first position, and an open condition that electrically disconnects the coil from the input conductors when the moveable piece is in its second position; and a disconnecting mechanism having a guiding member coupled to a RESET button, and a moveable part coupled to the guiding member, the disconnecting mechanism capable of moving between a disconnecting state that electrically disconnects the input conductors from the output conductors and a connecting state that electrically connects the input conductors to the output conductors, the disconnecting mechanism being disposed with respect to the moveable piece such that when the moveable piece is in its first position, the disconnecting mechanism is prevented from moving from the disconnecting state to the connecting state, and when the moveable piece is in its second position, the disconnecting mechanism is capable of moving from the disconnecting state to the connecting state when the guiding member is activated by the RESET button.

The present invention has many unique features and advantages. By including the moveable piece and the coil that can prevent electrical connections between the input and output conductors, the device not only has leakage current protection function, but also has a reliable reverse wiring protection function. If the wires from the power source are mistakenly connected to the LOAD side of the GFCI receptacle, the coil will fail to move the moveable piece, preventing the device from being reset by the RESET button. As a result, the GFCI receptacle will have no power output, thereby avoiding possible harm to its users.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Embodiments of the present invention are described with reference to the drawings. Although specific embodiments of the present invention will be described, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims. In particular, although in the following descriptions the circuit interrupting device is referred to as a GFCI receptacle, the invention is not limited to GFCI devices and are also useful in other types of leakage current protection devices.

Figure 1:
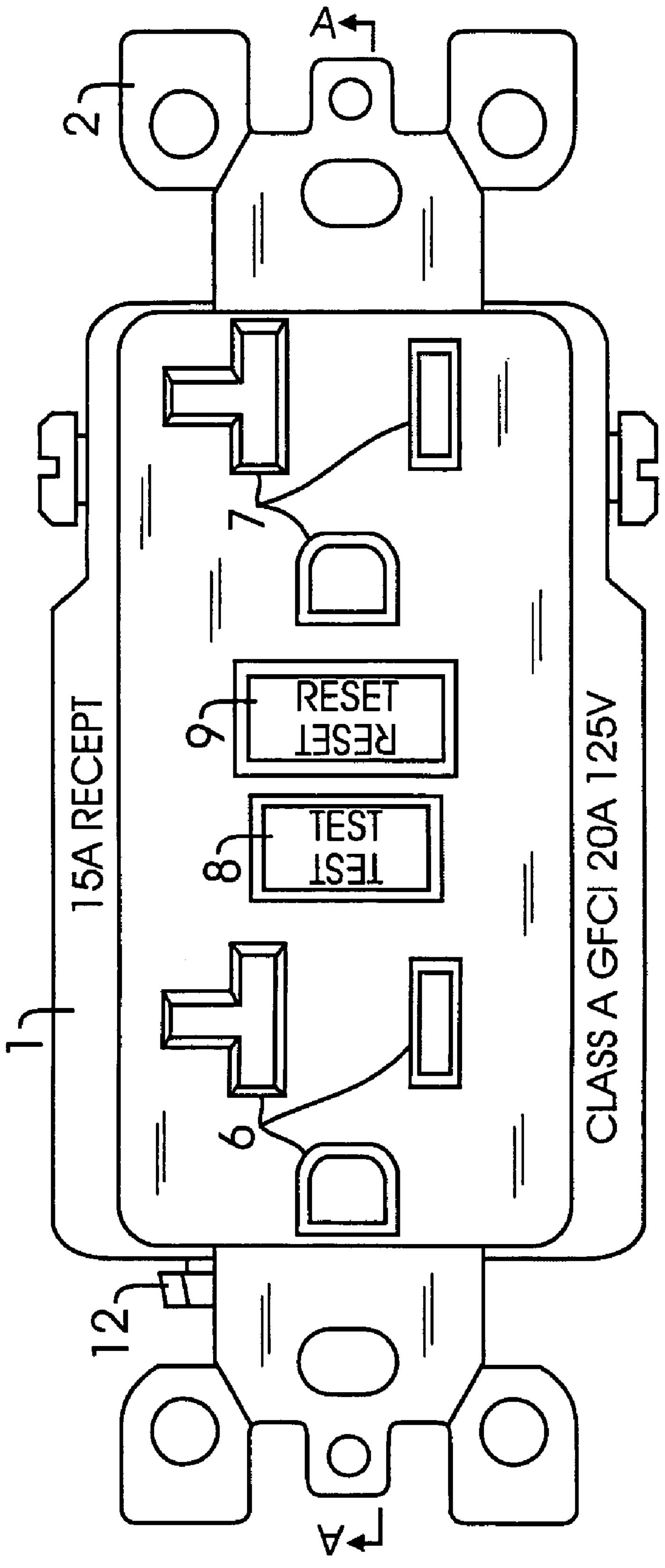
FIG. 1 is a plan view of the front of a device according to an embodiment of the present invention.
Figure 2A:
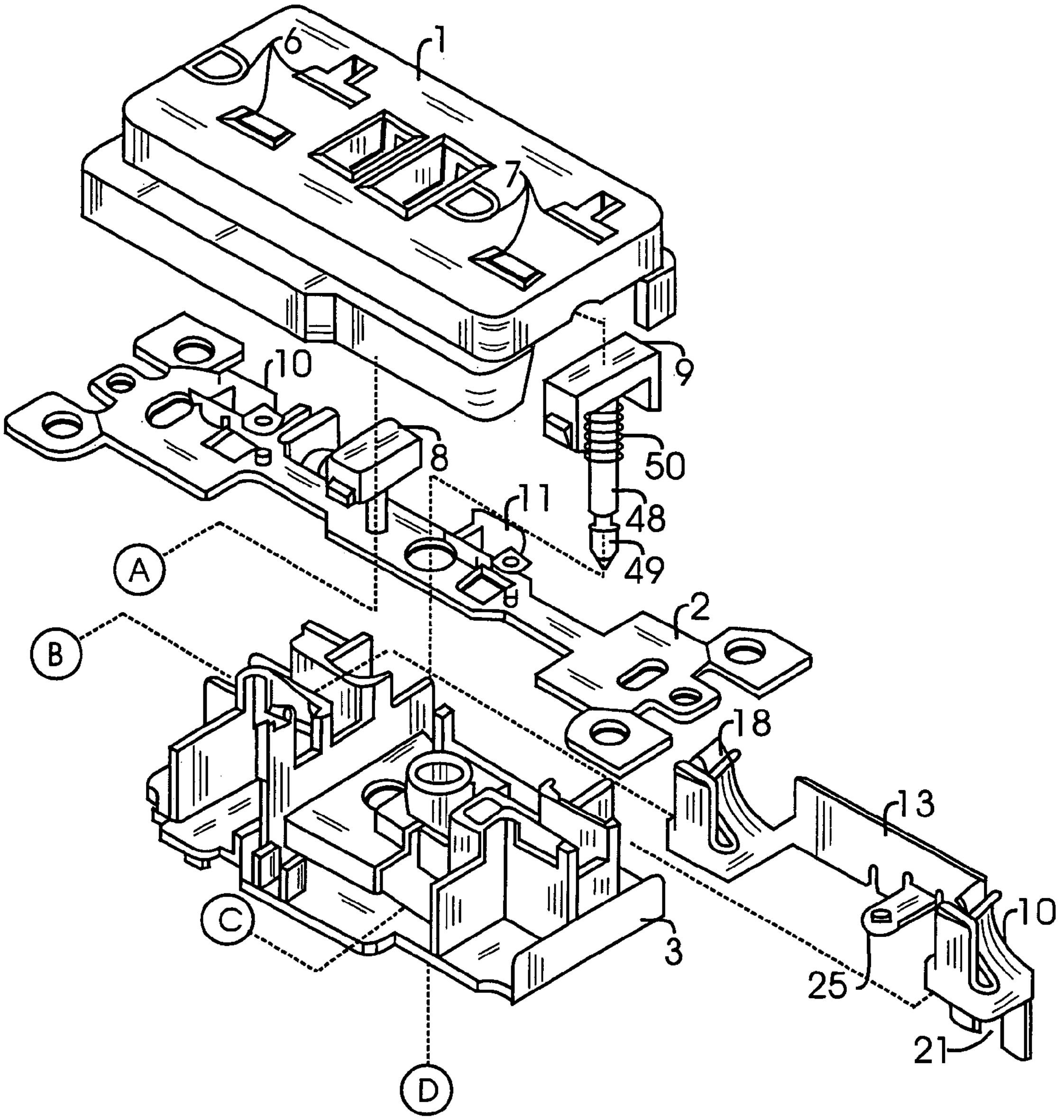
FIGS. 2A and 2B are an exploded view of the device of FIG. 1.
Figure 2B:
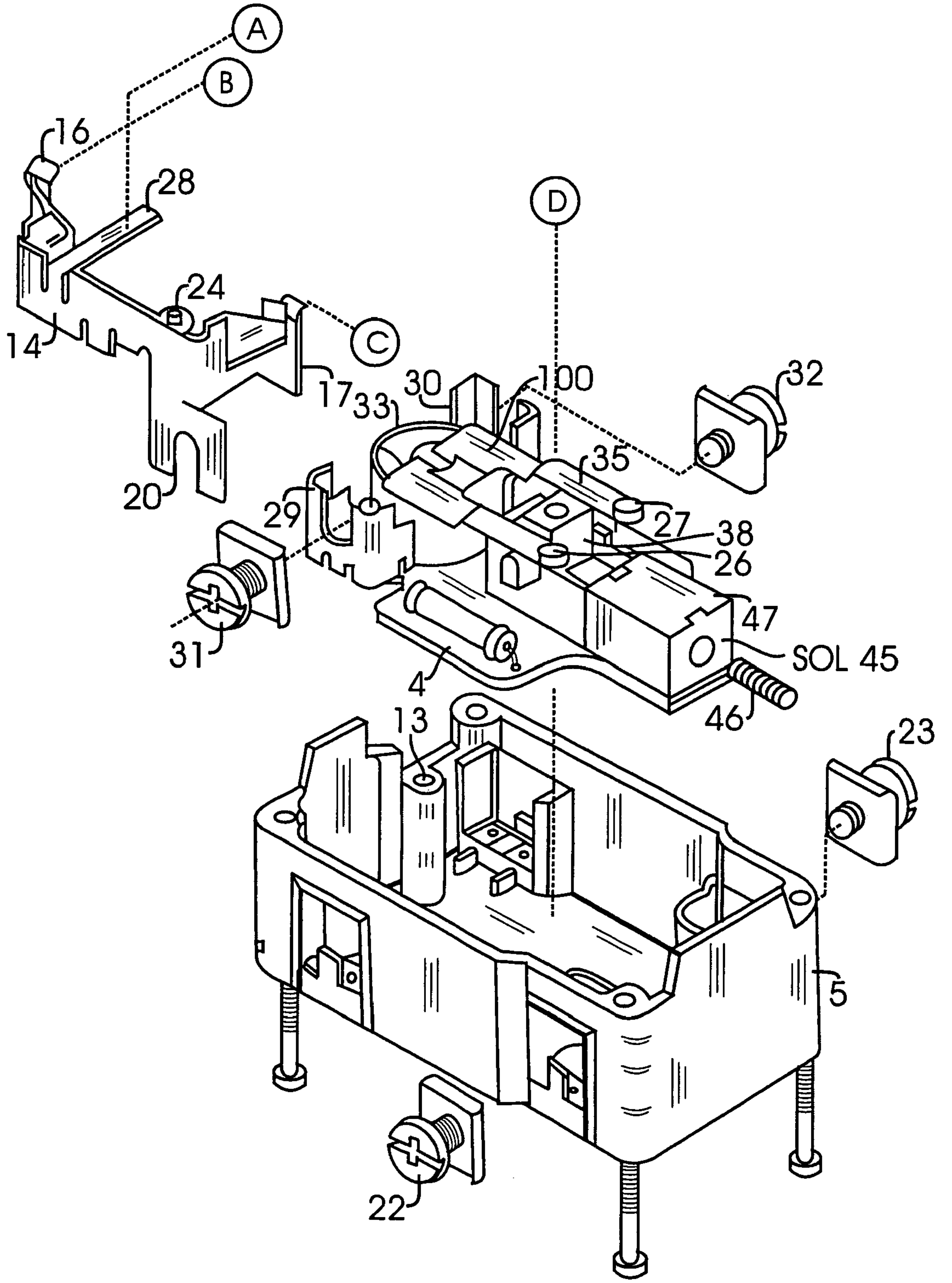
Figure 3:
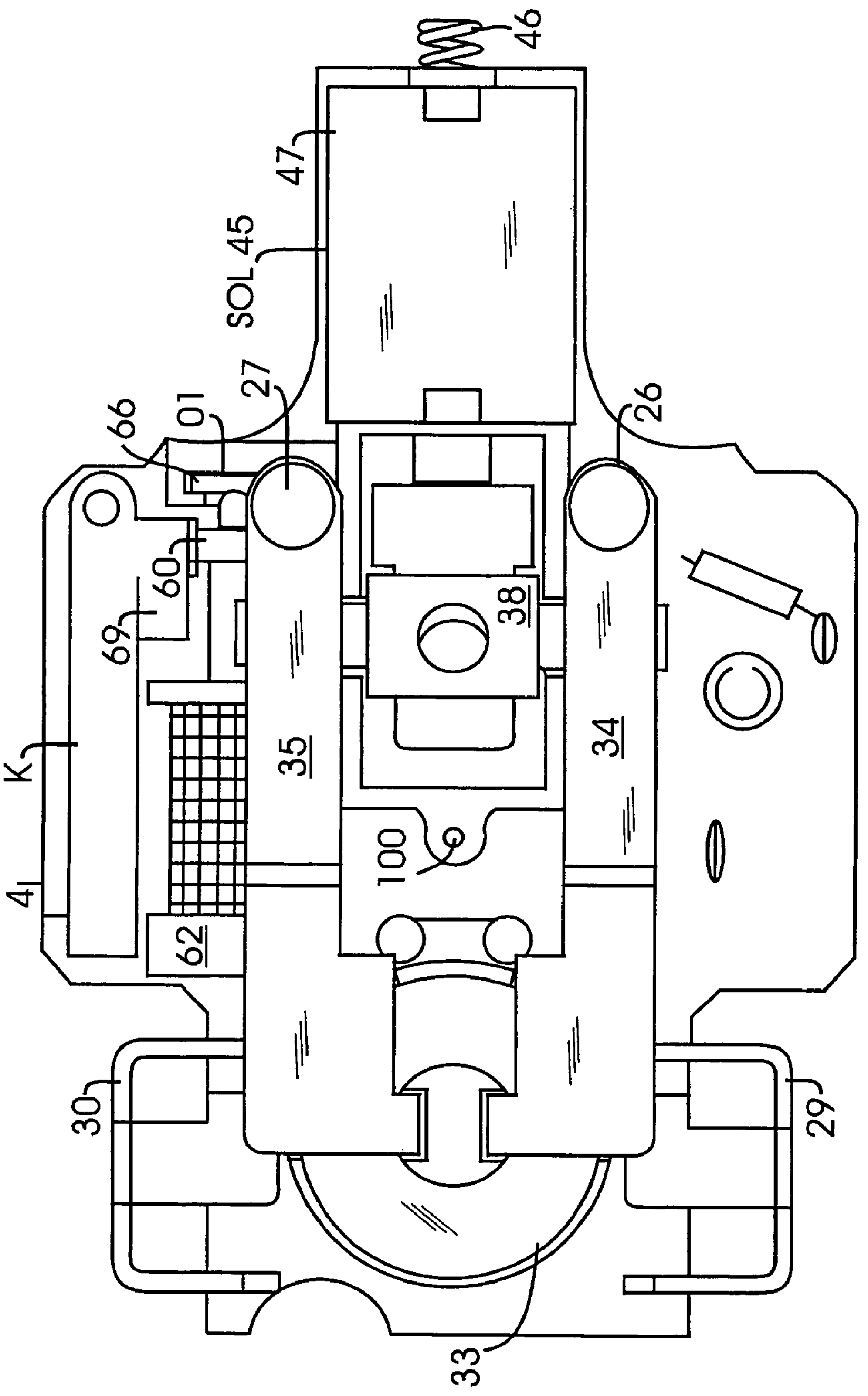
FIG. 3 shows a part of the internal structures of the device of FIG. 1.

As shown in FIGS. 1–3, a GFCI receptacle with reverse wiring protection according to an embodiment of the present invention includes a housing that has a cover 1 and a base 5, a mounting plate 2, an insulating member 3, and an electrical component mounting member 4. The mounting plate 2 is disposed between the cover 1 and the insulating member 3 and is connected to the ground by a conductor. The insulating member 3 is disposed between the mounting plate 2 and the electrical component mounting member 4, and is provided with hot (power) and neutral (white) output conductors. The electrical component mounting member 4 is disposed between the insulating member 3 and the base 5 and within the base 5, and is provided with input conductors for connecting to the hot and neutral lines of the power source. The electrical component mounting member 4 is additionally provided with a disconnecting mechanism for disconnecting the output conductors and input conductors, as well as a differential transformer for detecting a leakage current and a mechanism for preventing erroneous reverse connection of the input and output lines.

As shown in FIGS. 1 and 2, the cover 1 is provided with two outlets 6, 7 each for receiving a plug, an opening for a TEST button 8, and an opening for a RESET button 9.

The mounting plate 2 is provided with grounding connections 10, 11 and ground mounting screw 12. Grounding connectors 10, 11 are for connecting to corresponding ground prongs of plugs inserted into the outlets 6, 7. The ground mounting screw 12 is screwed into the grounding conductor hole 13 of the base 5, and is electrically connected to the ground through conductors.

As shown in FIG. 2, hot and neutral output conductors 14, 15 are disposed adjacent the insulating member 3. The output conductors 14, 15 are provided with insertion plates 16, 17 and 18, 19 for connecting to corresponding hot and neutral prongs of plugs inserted into the outlets 6, 7. Output conductors 14, 15 are additionally provided with U-shaped hot and neutral output connectors 20, 21, which are disposed on the sides of the base 5 and are coupled to output connecting screws 22, 23. Output conductors 14, 15 also have a pair of electrical terminals 24, 25 corresponding to hot and neutral moveable terminals 26, 27 provided on the electrical component mounting member 4. Further, a test plate 28 is provided on the hot output conductor 14 and disposed beneath the TEST button 8. Beneath the test plate 28 is a metal conductor 100 electrically connected to the ground or the neutral line of the power source (see FIG. 6).

As shown in FIGS. 2 and 3, the electrical component mounting member 4 disposed in the base 5 has a pair of hot and neutral input conductors 29, 30 connected to hot and neutral lines of the power source, respectively. Conductors 29, 30 are provided with U-shaped slots for receiving connecting screws 31, 32, respectively, which are connected to the hot and neutral lines of the power source. Disposed between the input conductor 29, 30 and through a space formed thereby is a differential transformer 33 (see FIG. 5). Disposed above and through the transformer 33 is a pair of input connector arms 34, 35 connected to the hot and neutral lines of the power source. One end of each of connector arms 34, 35 passes through the transformer 33 and is connected through electrical component mounting member 4 to the hot and neutral input conductors 29, 30, respectively. On the other end of each of connector arms 34, 35 is disposed hot and neutral moveable terminals 26, 27, respectively, which are connectable to electrical terminals 24, 25 of the hot and neutral output conductors 14, 15, respectively.

Figure 4A:
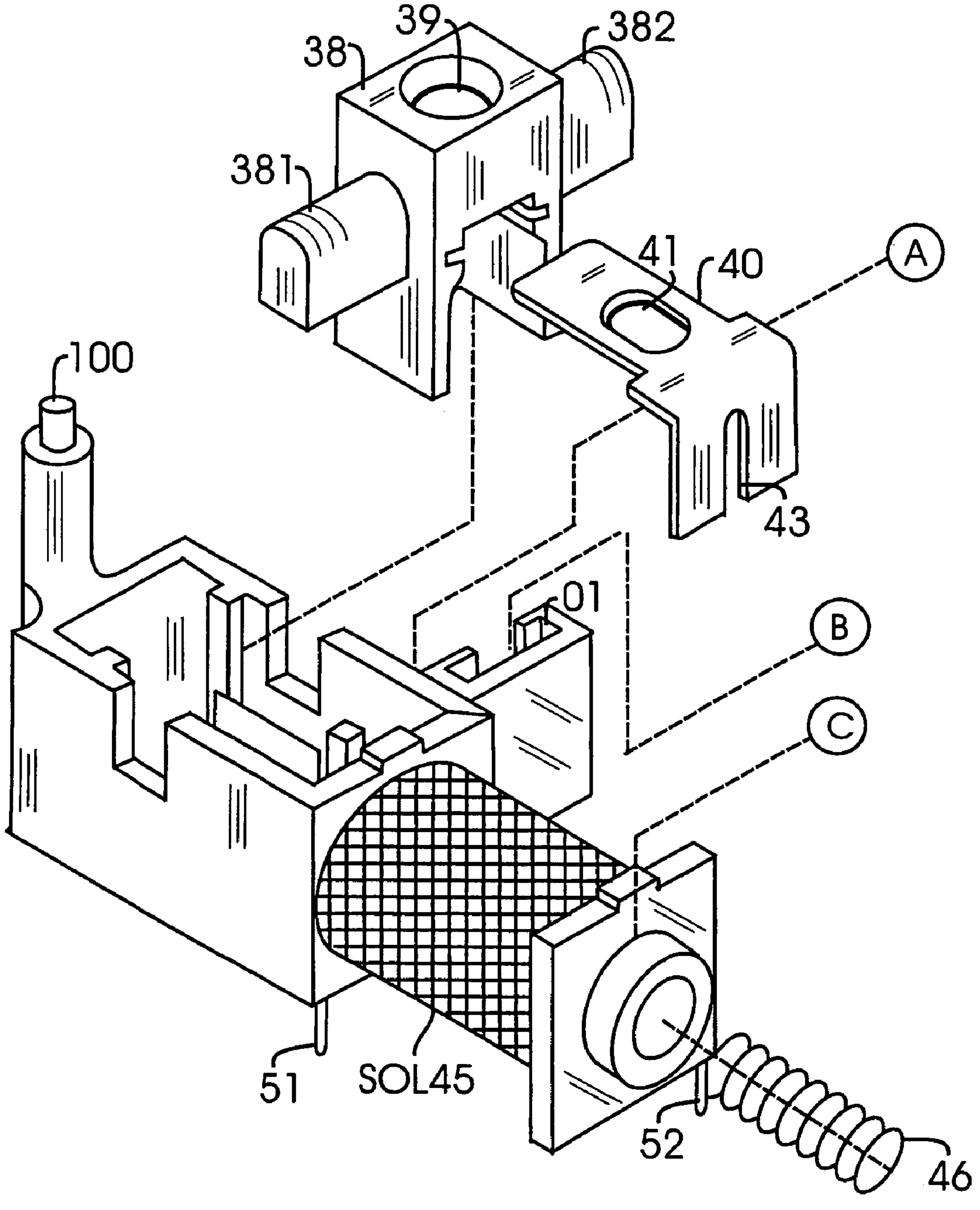
FIGS. 4A and 4B are an exploded view of a part of the device of FIG. 1.
Figure 4B:
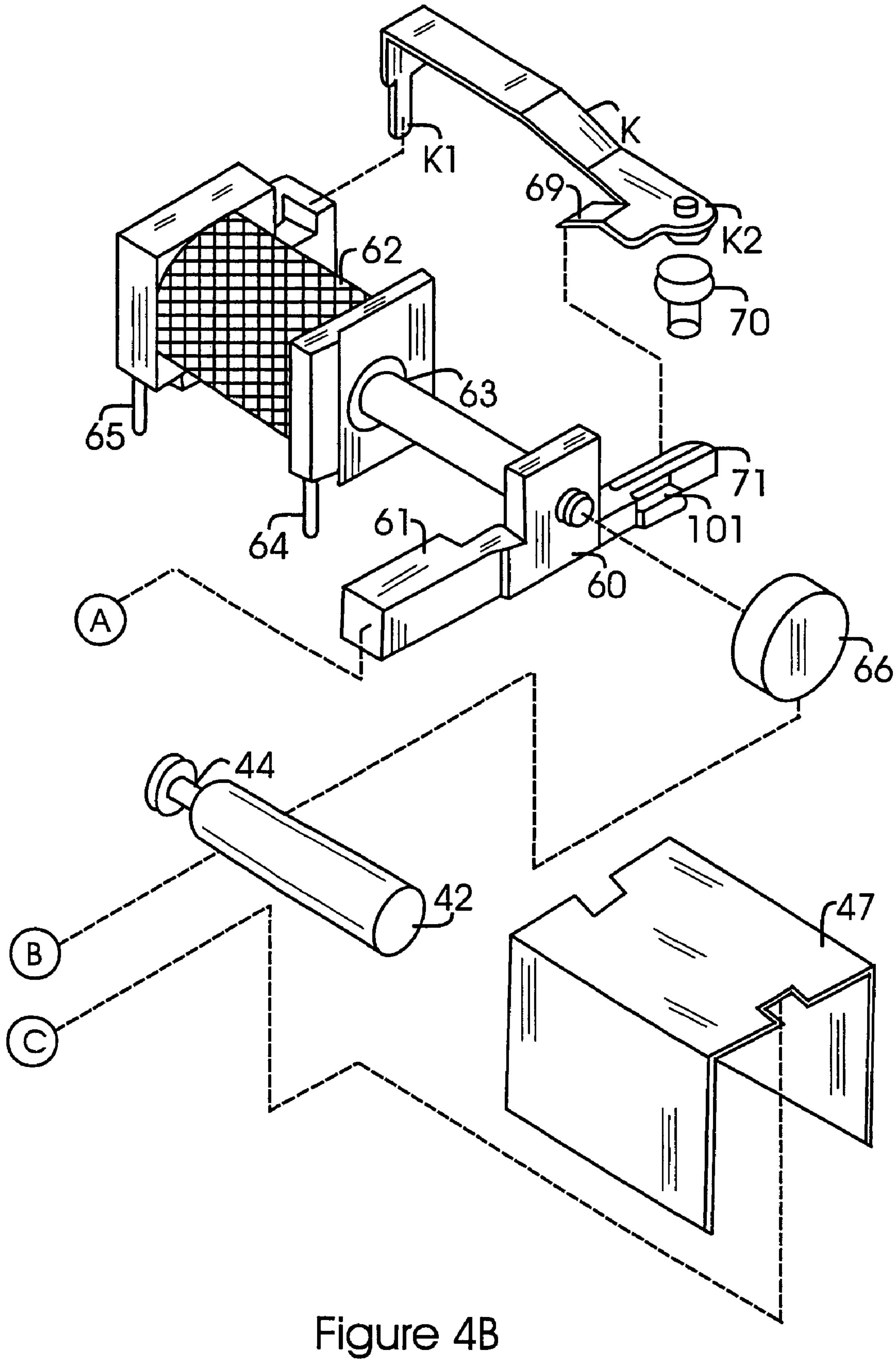

As shown in FIGS. 2, 3 and 4, the electrical component mounting member 4 is also provided with a disconnecting mechanism 38 capable of electrically connecting and disconnecting the hot and neutral input conductors 29, 30 to and from the hot and neutral output conductors 14, 15, as well as a disconnecting solenoid SOL 45 for activating the disconnecting mechanism 38.

As shown in FIGS. 3 and 4, the disconnecting mechanism 38 has two side arms 381, 382 respectively disposed below the input connector arms 34, 35 near the end where the moveable terminals 26, 27 are provided. The disconnecting mechanism 38 has a through hole 39, below which is slideably disposed an L-shaped lock member 40 having an oval opening 41. On the bent portion of the lock member 40 is provided a U-shaped slot 43 for receiving a neck portion 44 of a plunger 42. The plunger 42 is disposed inside the solenoid SOL 45, where a spring 46 is also disposed. A U-shaped container 01 is provided adjacent the solenoid for housing a permanent magnet 66.

In the through hole 39 of the disconnecting mechanism 38 is a cylindrical metal guiding member 48 (see FIG. 2), which passes through the insulating member 3 and mounting plate 2 to reach under the RESET button 9. The lower end of the guiding member 48 has an end portion 49 in the shape of a cone with a neck portion, and the upper end of the guiding member 48 is coupled to the RESET button 9. A reset spring 50 is provided outside of the guiding member 48 near its upper end between the RESET button 9 and the insulating member 3.

To move the guiding member 48 inside the disconnecting mechanism 38 and to move the disconnecting mechanism 38 with it, the disconnecting solenoid SOL 45 is provided with two electrical connecting posts 51, 52 (FIGS. 4, 5) soldered to the electrical component mounting member 4. Connecting post 51 is connected through a silicon controlled rectifier (SCR) to the negative DC terminal of the diode bridge rectifier circuit, while connecting post 52 is connected to the hot wire on the LINE side.

To provide a reverse wiring protection function by preventing the electrical connection between the input hot and neutral lines and the output hot and neutral lines when the external lines to the power source and load are incorrectly connected, a moveable piece 60 and a coil 62 capable of moving the piece 60 are provided on the side of the disconnecting mechanism 38, as shown in FIGS. 3 and 4. The moveable piece 60 is fixed on a core 63 of the coil 62. Near the head of the core 63, on the side of the disconnecting solenoid SOL 45, is the permanent magnet 66 disposed in the U-shaped container 01. One end 61 of moveable piece 60 is located below the cone-shaped end portion 49 of the guiding member 48, the guiding member passing through the through hole 39 of the disconnecting mechanism 38 and the open opening 41 of the lock member 40 (see FIG. 8). The other end 71 of the moveable piece 60 is located below a switch plate K which is disposed adjacent the coil 62.

Figure 5:
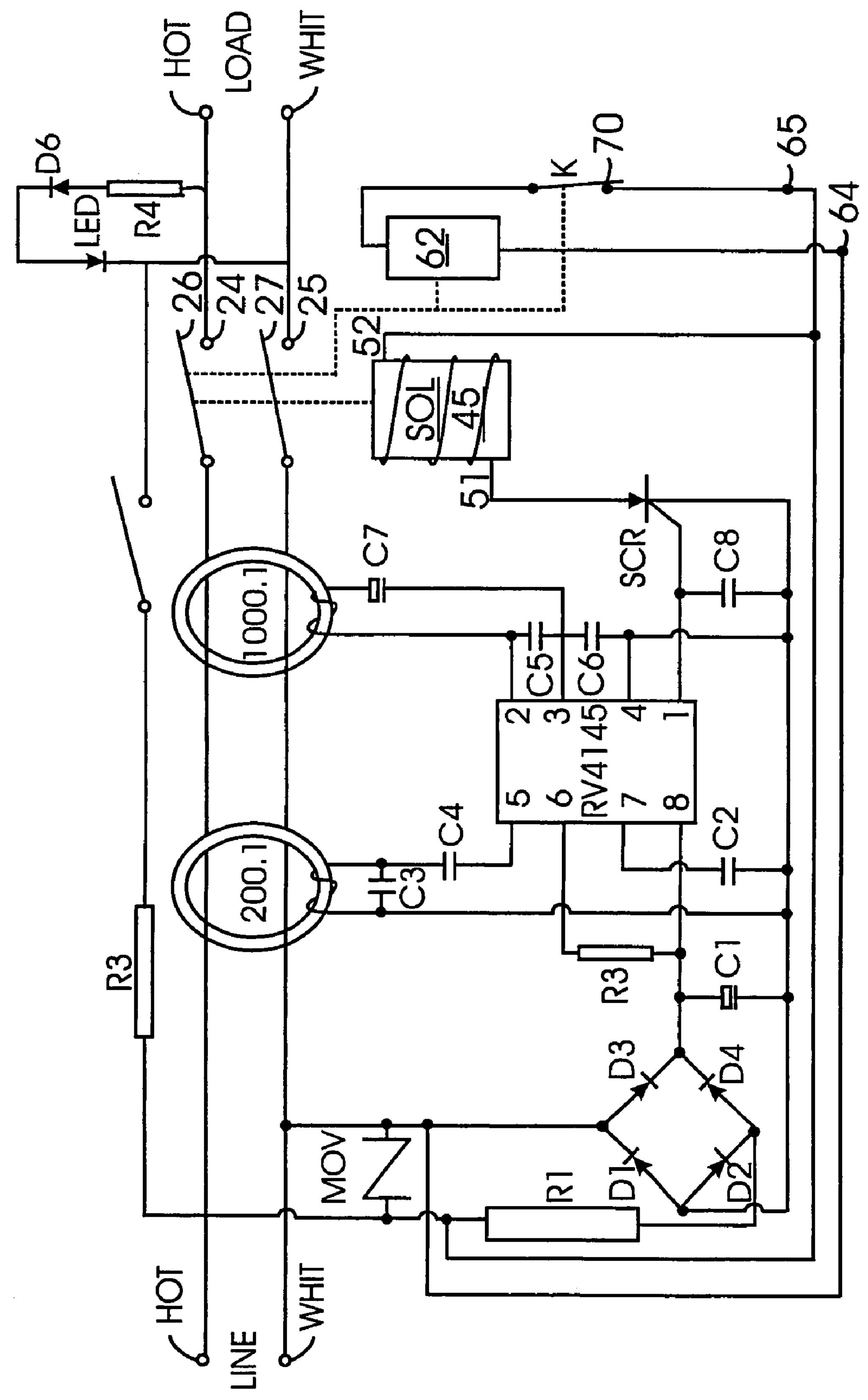
FIG. 5 is a circuit diagram of the device according to an embodiment of the present invention.

The switch plate K has one end K1 inserted into a tail end of the coil 62 and another end K2 provided with a contacting terminal 70, which corresponds to the switch 70 shown in the circuit diagram in FIG. 5. On the switch plate K near the end of terminal 70 is provided a self-locking lock plate 69, which cooperates with a groove 101 on the moveable piece 60.

As shown in FIG. 5, the coil 62 for moving the piece 60 has two connection pins 64, 65 soldered onto the electrical component mounting member 4. Pin 64 is connected through the member 4 to the neutral (WHITE) line of the input side (LINE) of the receptacle, and pin 65 is connected through the contacting terminal 70 to the hot (HOT) line of the input side (LINE).

As shown in FIG. 5, when a receptacle according to the present embodiment is correctly connected to the power source, i.e. when the power source is connected to the LINE side, an electric current flows through coil 62 to generate a magnetic field. The magnetic field moves the moveable piece 60, causing the lock plate 69 on the switch plate K to slide into the groove 101 on the piece 60, and at the same time electrically opens the switch 70 (contacting terminal 70) which is connected between the coil 62 and the HOT line on the LINE side. This results in the moveable piece 60 and the core 63 fixed thereon being permanently locked. During the sliding movement of the moveable piece 60, its end 61 moves out of the way of the guiding member 48, thereby permitting the guiding member 48 to move inside the through hole 39 of the mechanism 38, allowing electrical connection between the input and output side of the receptacle.

If, on the other hand, when a receptacle according to the present embodiment is incorrectly connected on its first use, i.e., if the power source is connected to the LOAD side of the receptacle, as shown in FIG. 5, an electrical current does not pass through the coil 62. Thus, the moveable piece 60 does not move and remains in a reset-prevented state. The guiding member 48 cannot move inside the through hole 39 of the mechanism 38, preventing the electrical connection between the input and output side of the receptacle.

Referring to FIGS. 5 to 8, the principle of the reverse wiring protection of the GFCI receptacle according to embodiments of the present invention is described.

Figure 6:
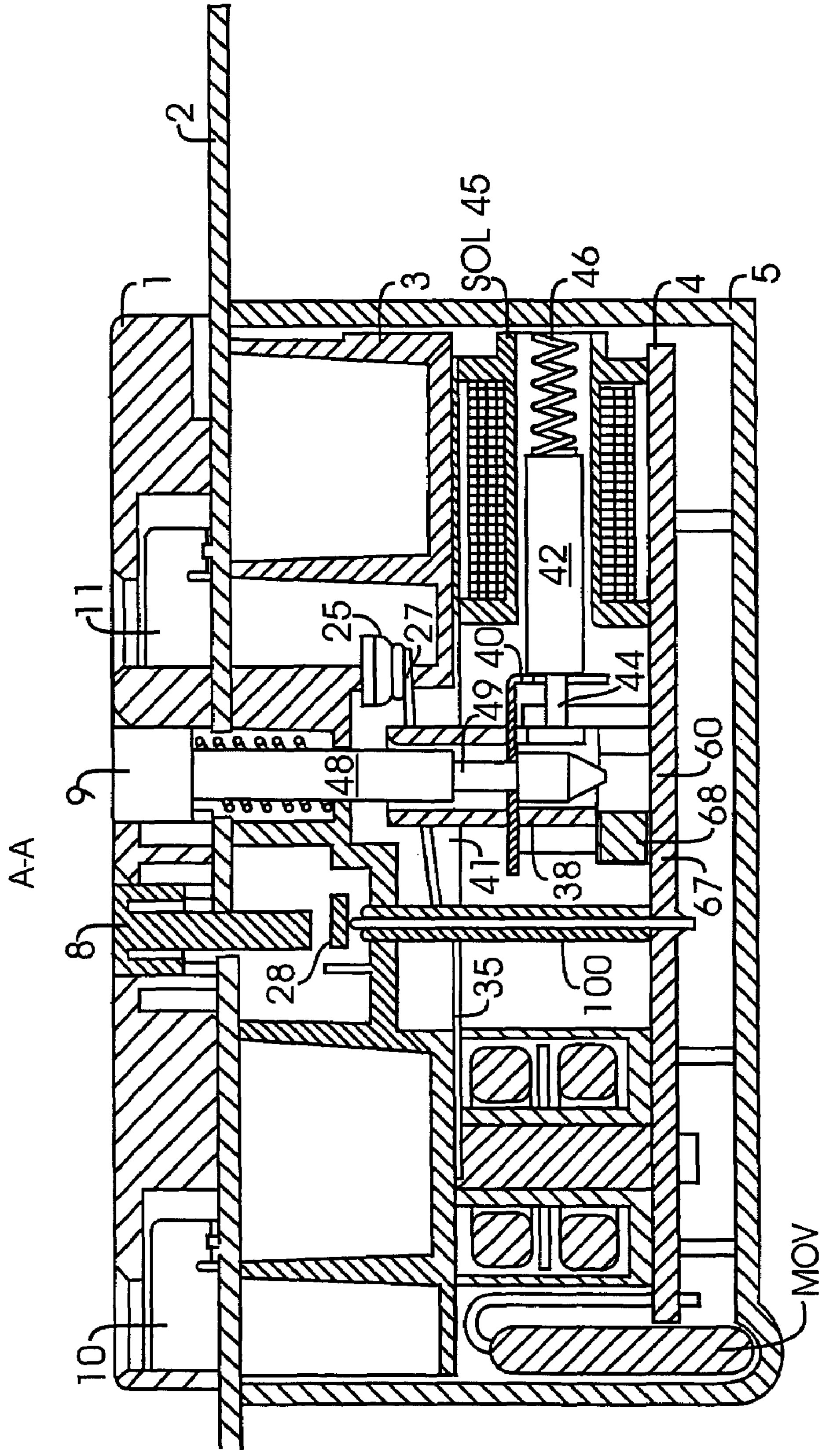
FIG. 6 is a cross-sectional view along the line A—A of FIG. 1 illustrating a connection condition when the device is correctly installed.

FIG. 6 illustrates the electrical connection of the receptacle under a correct installation condition. As shown in FIGS. 5 and 6, when the hot and neutral (white) wires of the power source are connected to the LINE side HOT and WHITE lines of the receptacle, an electrical current passes through the coil 62 to generate a magnetic field. The magnetic field moves the moveable piece 60 to a position where the lock plate 69 on the switch plate K locks into the groove 101 on the piece 60. At the same time, the moveable piece 60 causes the switch 70 to become open, cutting off the current in the coil 62, so that the moveable piece 60 is locked into position by the lock plate 69 and the groove 101.

During the sliding movement of the moveable piece 60 when a current passes through the coil 62, the moveable piece 60 rapidly moves from a position indicated by reference symbol 68 to a position indicated by reference symbol 67, so that its end 61 moves out of the way of the guiding member 48. In this condition, when the RESET button 9 is pressed, the cone-shaped end 49 of metal guiding member 48 slides into the oval opening 41 of the L-shaped lock member 40 which is being biased by spring 46 and plunger 42. When the RESET button 9 is released, it is biased upwards by the reset spring 50, bringing the metal guiding member 48 coupled thereto upwards. The metal guiding member 48 in turn brings the disconnecting mechanism 38 upwards. Because the hot and neutral input connector arms 34, 35 are located above the two side arms 381, 382 of the disconnecting mechanism 38, they move upwards as the disconnecting mechanism 38 moves, causing hot and neutral moveable terminals 26, 27 of the connector arms 34, 35 to be in contact with the electrical terminals 24, 25 of the hot and neutral output conductors 14 and 15. As a result, the input lines of the receptacle are electrically connected to the output lines under the correct wiring condition.

Figure 7:
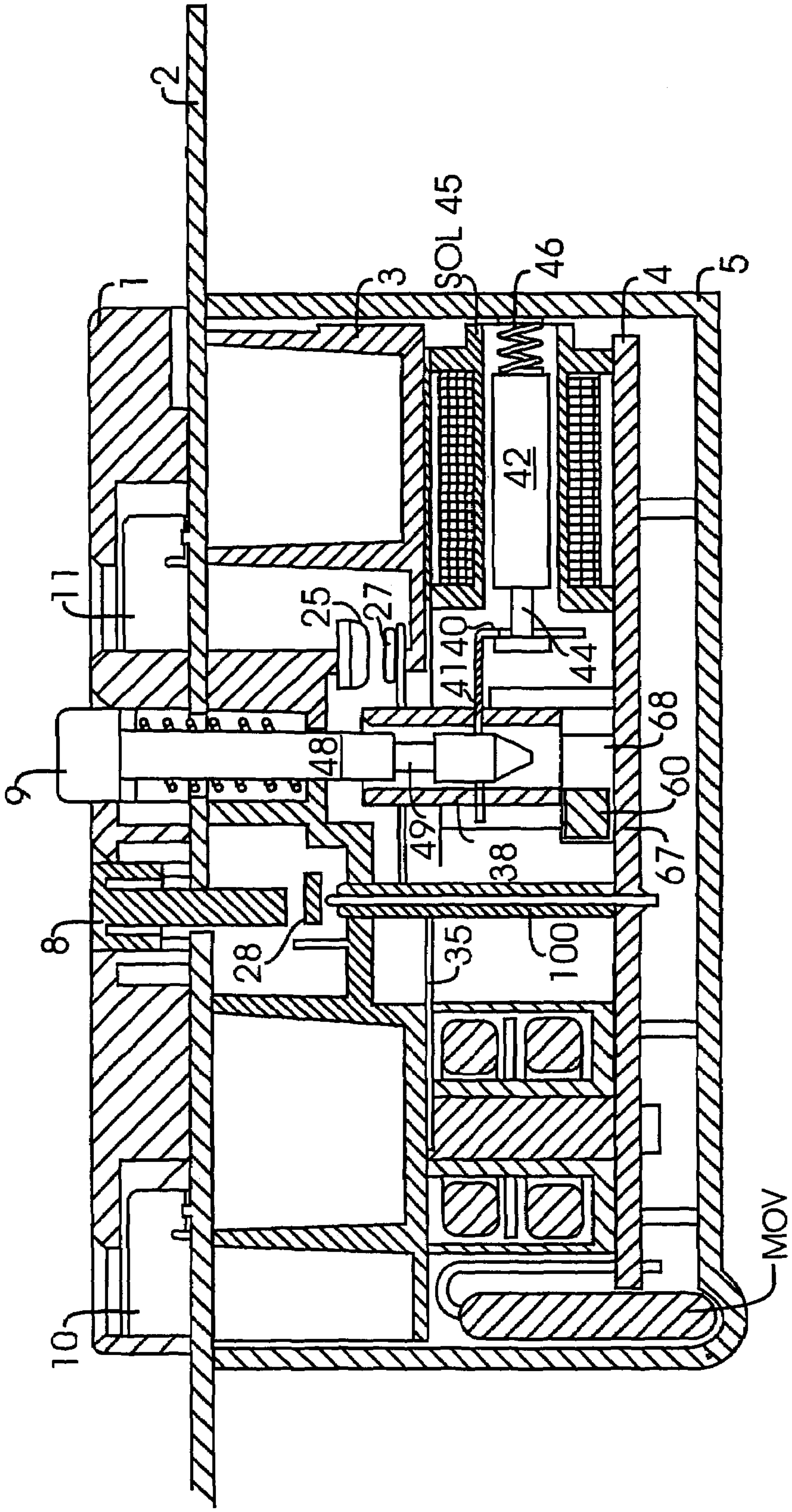
FIG. 7 is a cross-sectional view along the line A—A of FIG. 1 illustrating a disconnection condition when the device is correctly installed.

When the power output of the receptacle is to be cut off, as shown in FIGS. 7 and 5, the TEST button 8 is pressed, causing the test plate 28 of the hot output conductor 14 to contact conductor 100 to generate a short current (leakage current). The differential transformer 33 detects this current, causing the SCR to conduct. The disconnecting solenoid SOL 45 is energized and the magnetic field causes the plunger 42 to pull the lock member 40 rapidly to the right. This allows the end portion 49 of the guiding member 48 to rapidly move upward and escape from the open opening 41 of the lock member 40. Meanwhile, the disconnecting mechanism 38 moves downwards, bringing the input connector arms 34, 35 downwards to disconnect the moveable terminals 26, 27 from the electrical terminals 24, 25, thereby electrically disconnecting the input and output lines of the receptacle.

Similarly, when a short or current leakage occurs during use, the differential transformer 33 detects this current. In a series of events similar to those described in the preceding paragraph (see FIGS. 7 and 5), the electrical connection between the input and output lines of the receptacle is cut off.

Figure 8:
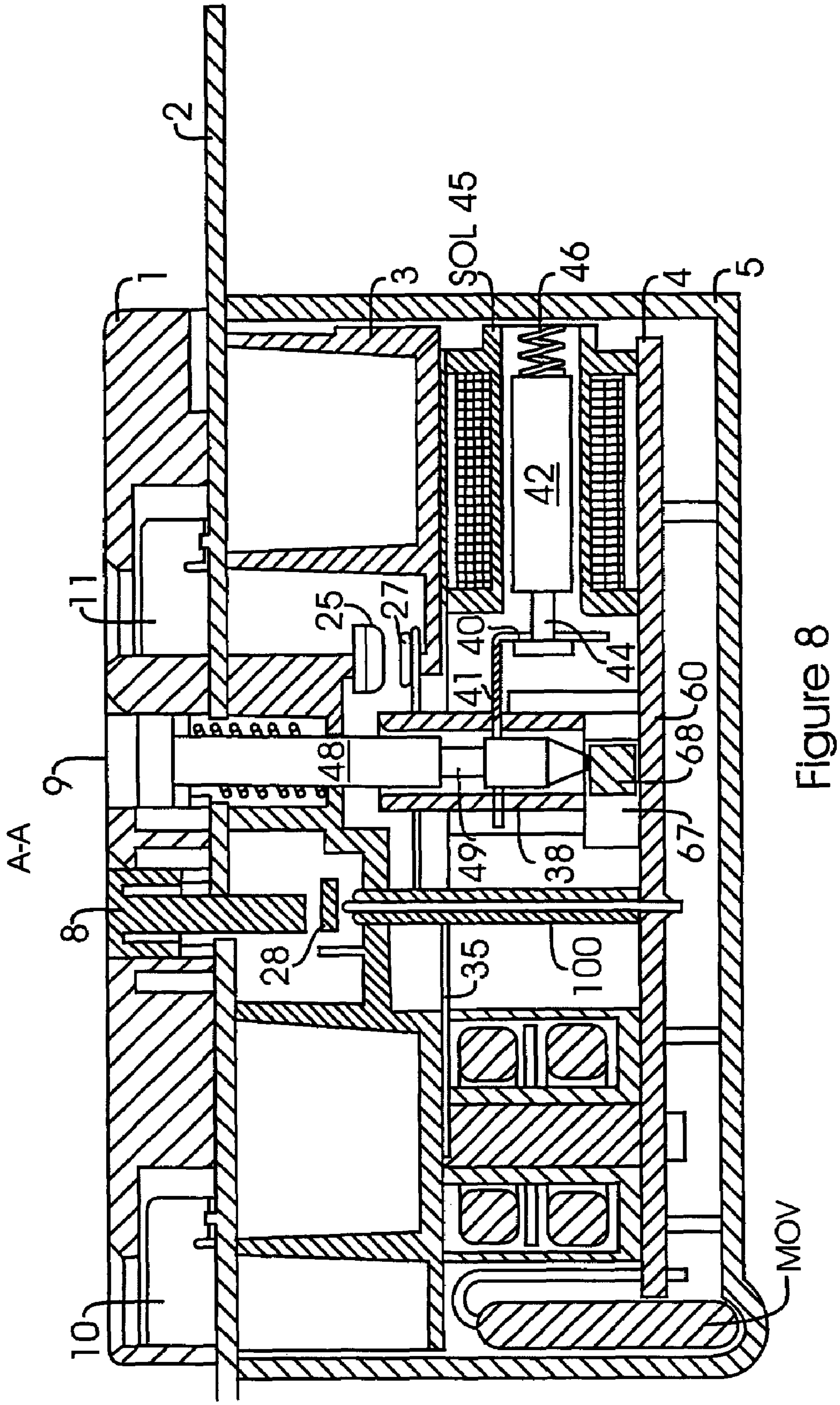
FIG. 8 is a cross-sectional view along the line A—A of FIG. 1 illustrating a disconnection condition when the device is incorrectly installed.

FIG. 8 illustrates the electrical connection of the receptacle under an incorrect installation condition, where the device functions to prevent the input lines from being connected to the output lines of the receptacle. As shown in FIGS. 8 and 5, when the GFCI device is installed for the first time, if the wires from the power source is erroneously connected to output terminals (LOAD) of the GFCI receptacle and the wires for a load is erroneously connected to its input terminals (LINE), no current flows through the coil 62. This is because the connection pins 64, 65 of the coil 62 are connected to the hot and neutral terminals of the LINE side of the receptacle, and the hot and neutral moveable terminals 26, 27 are disconnected from the electrical terminals 24, 25 in an initial state of the receptacle. Since the coil 62 does not generate a magnetic field, the moveable piece 60 remains in position 68. In this condition, even when the RESET button 9 is pressed, the cone-shaped end 49 of the guiding member 48 remains resting on the end 61 of the moveable piece 60, preventing the guiding member 48 from moving inside the through hole 39 of the disconnecting mechanism 38. As a result, the input connector arms 34, 35 are not brought upwards, and the moveable terminals 26, 27 are prevented from being electrically connected to the electrical terminals 24, 25. This achieves the goal of reverse wiring protection, i.e., preventing the electrical connection between the input and output lines when the LINE and LOAD side wires are incorrectly connected.

Defined in detail, the present invention is a circuit interrupting device including: a housing that includes a cover and a base; a mounting plate; an insulating member; and an electrical component mounting member. The mounting plate is disposed between the cover and the insulating member and is connected to ground by a conductor. The insulating member is disposed between the mounting plate and the electrical component mounting member, and includes hot (power) and neutral (white) output conductors. The electrical component mounting member is disposed between the insulating member and the base and within the base, and includes hot and neutral input conductors for connecting to hot and neutral lines of a power source, a differential transformer for detecting a leakage current, a pair of connector arms disposed above and through the transformer and connected to the input conductors, and a disconnecting mechanism for connecting and disconnecting the output conductors to and from input conductors. The disconnecting mechanism includes a solenoid electrically connected at one end to the hot input connector, a plunger and a spring disposed inside the solenoid, two side arms respectively disposed below the connector arms, an L-shaped lock member slideably disposed below a through hole define in the disconnecting mechanism, the lock member defining an oval opening and a U-shaped slot for receiving a neck portion of the plunger, a cylindrical metal guiding member disposed in the through hole of the disconnecting mechanism and passing through the insulating member and the mounting plate, wherein a lower end of the guiding member has an end portion in the shape of a cone with a neck portion, a RESET button fixed at an upper end of the guiding member, and a reset spring disposed near the upper end of the guiding member between the RESET button and the insulating member.

The circuit interrupting device defined above may further includes a mechanism for preventing reverse wiring, the mechanism including: a coil having a core; a moveable piece fixed on the core; and a switch plate disposed adjacent the coil, one end of the switch plate being inserted into a tail end of the coil, another end of the switch plate being provided with a contacting terminal and a self-locking lock plate. One end of the moveable piece is located below the cone-shaped end portion of the guiding member in the through hole of the disconnecting mechanism, another end of the moveable piece is located below the switch plate and defines a groove capable of cooperating with the self-locking lock plate of the switch plate to lock the moveable piece and the switch plate. The coil is electrically connected at one end to the neutral input conductor and at the other end through the switch plate to the hot input conductor.

Defined broadly, the present invention is a circuit interrupting device having: hot and neutral input conductors for connecting to hot and neutral lines of a power source; hot and neutral output conductors for connecting to hot and neutral lines of a load; a coil electrically connected to the hot and neutral input conductors; a moveable piece capable of moving from a first position to a second position when the coil is energized; a switch electrically connected to the coil, the switch having a locking mechanism cooperating with the moveable piece to lock the moveable piece when it is in its second position, the switch being in a closed condition that electrically connects the coil to the input conductors when the moveable piece is in its first position, and an open condition that electrically disconnects the coil from the input conductors when the moveable piece is in its second position; and a disconnecting mechanism having a guiding member coupled to a RESET button, and a moveable part coupled to the guiding member, the disconnecting mechanism capable of moving between a disconnecting state that electrically disconnects the input conductors from the output conductors and a connecting state that electrically connects the input conductors to the output conductors, the disconnecting mechanism being disposed with respect to the moveable piece such that when the moveable piece is in its first position, the disconnecting mechanism is prevented from moving from the disconnecting state to the connecting state, and when the moveable piece is in its second position, the disconnecting mechanism is capable of moving from the disconnecting state to the connecting state when the guiding member is activated by the RESET button.

The circuit interrupting device defined above may further comprises: a solenoid; a differential transformer for detecting a leakage current; a circuit connected to the differential transformer for energizing the solenoid when a leakage current is detected; and a plunger disposed inside the solenoid, the plunger being coupled to the disconnecting mechanism to cause the disconnecting mechanism to move from the connecting state to the disconnecting state when the solenoid is energized.

Defined more broadly, the present invention is a circuit interrupting device that prevents the input and out lines from being electrically connected when the external power and load lines are incorrectly connected to the device.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A circuit interrupting device comprising:

a housing that includes a cover and a base;

a mounting plate;

an insulating member; and an electrical component mounting member, the mounting plate being disposed between the cover and the insulating member and is connected to a ground by a conductor, the insulating member being disposed between the mounting plate and the electrical component mounting member, and including hot and neutral output conductors, the electrical component mounting member being disposed between the insulating member and the base and within the base, and including hot and neutral input conductors for connecting to hot and neutral lines of a power source, a differential transformer for detecting a leakage current, a pair of connector arms disposed above and through the differential transformer and connected to the input conductors, a solenoid electrically connected at one end to the hot input connector, a plunger and a spring disposed inside the solenoid, and a disconnecting mechanism for connecting and disconnecting the output conductors to and from input conductors, the disconnecting mechanism including:

two side arms respectively disposed below the connector arms, an L-shaped lock member slideably disposed below a through hole define in the disconnecting mechanism, the lock member defining an oval opening and a U-shaped slot for receiving a neck portion of the plunger, a cylindrical metal guiding member disposed in the through hole of the disconnecting mechanism and passing through the insulating member and the mounting plate, wherein a lower end of the guiding member has an end portion in the shape of a cone with a neck portion, a reset button fixed at an upper end of the guiding member, and a reset spring disposed near the upper end of the guiding member between the reset button and the insulating member.

2. The circuit interrupting device of claim 1, further including a mechanism for preventing reverse wiring, the mechanism including:

a coil and a core;

a moveable piece fixed on the core; and a switch plate disposed adjacent the coil, one end of the switch plate being inserted into a tail end of the coil, another end of the switch plate being provided with a contacting terminal and a self-locking lock plate, wherein one end of the moveable piece is located below the cone-shaped end portion of the guiding member in the through hole of the disconnecting mechanism, another end of the moveable piece is located below the switch plate and defines a groove capable of cooperating with the self-locking lock plate of the switch plate to lock the moveable piece and the switch plate, and wherein the coil is electrically connected at one end to the neutral input conductor and at the other end through the switch plate to the hot input conductor.

3. The circuit interrupting device of claim 2, further comprising a permanent magnet disposed in a U-shaped container adjacent the solenoid.

4. The circuit interrupting device of claim 3, further comprising:

a test button;

a test plate provided on the hot output conductor and disposed beneath the test button; and a metal conductor disposed beneath the test plate and electrically connected to the neutral input conductor.

5. A circuit interrupting device comprising:

hot and neutral input conductors for connecting to hot and neutral lines of a power source;

hot and neutral output conductors for connecting to hot and neutral lines of a load;

a coil electrically connected to the hot and neutral input conductors;

a moveable piece capable of moving from a first position to a second position when the coil is energized;

a switch electrically connected to the coil, the switch having a locking mechanism capable of cooperating with the moveable piece to lock the moveable piece when it is in its second position, the switch being in a closed condition that electrically connects the coil to the input conductors when the moveable piece is in its first position, and an open condition that electrically disconnects the coil from the input conductors when the moveable piece is in its second position; and a disconnecting mechanism having a guiding member coupled to a reset button, and a moveable part capable of being coupled to the guiding member, the disconnecting mechanism capable of moving between a disconnecting state that electrically disconnects the input conductors from the output conductors and a connecting state that electrically connects the input conductors to the output conductors, the disconnecting mechanism being disposed with respect to the moveable piece such that when the moveable piece is in its first position, the disconnecting mechanism is prevented from moving from the disconnecting state to the connecting state, and when the moveable piece is in its second position, the disconnecting mechanism is capable of moving from the disconnecting state to the connecting state when the guiding member is activated by the reset button.

6. The circuit interrupting device of claim 5, further comprising:

a solenoid;

a differential transformer for detecting a leakage current;

a circuit connected to the differential transformer for energizing the solenoid when a leakage current is detected; and a plunger disposed inside the solenoid, the plunger being coupled to the disconnecting mechanism to cause the disconnecting mechanism to move from the connecting state to the disconnecting state when the solenoid is energized.

7. The circuit interrupting device of claim 6, further comprising a test button connected to a conductor to generate a leakage current when the test button is pressed.

8. The circuit interrupting device of claim 5, wherein the disconnecting mechanism further comprises a lock member slideably disposed below a through hole define in the disconnecting mechanism, the lock member defining an oval opening below the through hole, wherein the guiding member is moveably disposed within the through hole of the disconnecting mechanism, wherein a lower end of the guiding member has an end portion in the shape of a cone with a neck portion, wherein the reset button is fixed to an upper end of the guiding member, and wherein the moveable piece is located below the lower end of the guiding member when the moveable piece is in its first position.

* * * * *